United States Patent [19]

Held

[11] 4,001,891
[45] Jan. 4, 1977

[54] DIRECT INDIVIDUAL PROGRAM READOUT OF EIGHT-TRACK TAPE CARTRIDGE

[76] Inventor: Leon D. Held, 6861 SW. 51st St., Miami, Fla. 33155

[22] Filed: Apr. 30, 1975

[21] Appl. No.: 573,221

[52] U.S. Cl. .................. 360/132; 116/133; 242/199; 360/94
[51] Int. Cl.$^2$ .................. G11B 23/04; G09F 9/00
[58] Field of Search ............. 360/132, 134, 94, 85, 360/75, 77–78; 116/133, 67 R, 67 A, 114 J, 114 H

[56] References Cited

UNITED STATES PATENTS

| | | | |
|---|---|---|---|
| 3,532,347 | 10/1970 | Parsons | 360/94 |
| 3,552,751 | 1/1971 | Kelso | 360/94 |
| 3,623,450 | 11/1971 | Siller | 360/132 |
| 3,632,896 | 1/1972 | Ban | 360/94 |
| 3,656,761 | 4/1972 | Laschenski | 360/132 |
| 3,705,699 | 12/1972 | Siller | 360/132 |

OTHER PUBLICATIONS

IBM Technical Bulletin, Tape Cartridge, R. B. Johnson et al., vol. 9, No. 6, Nov. 1966, p. 576.

Primary Examiner—Alfred H. Eddleman
Attorney, Agent, or Firm—Beveridge, DeGrandi, Kline & Lunsford

[57] ABSTRACT

A device for directly indicating the programs being reproduced from a particular track of a magnetic tape located within a tape cartridge. The tape cartridge includes an opening in the front of the cartridge with a four-sided program indicator shaft adjacent to the opening and containing indicia indicative of the particular programs being played on a particular track. A drive shaft along one side of the cartridge engages the program indicator shaft, with the drive shaft in turn being engaged through an aperture in the cartridge by a push shaft mounted within a magnetic tape reproduction apparatus. The push shaft is actuated by an appropriate solenoid means in electrical parallel with program indicator lights in the magnetic tape reproduction apparatus such that a change of channel being reproduced from the magnetic tape will cause extension of the push shaft and consequential rotation of the program indicator shaft to a new position indicating the programs currently being reproduced.

4 Claims, 5 Drawing Figures

U.S. Patent  Jan. 4, 1977  Sheet 1 of 2  4,001,891
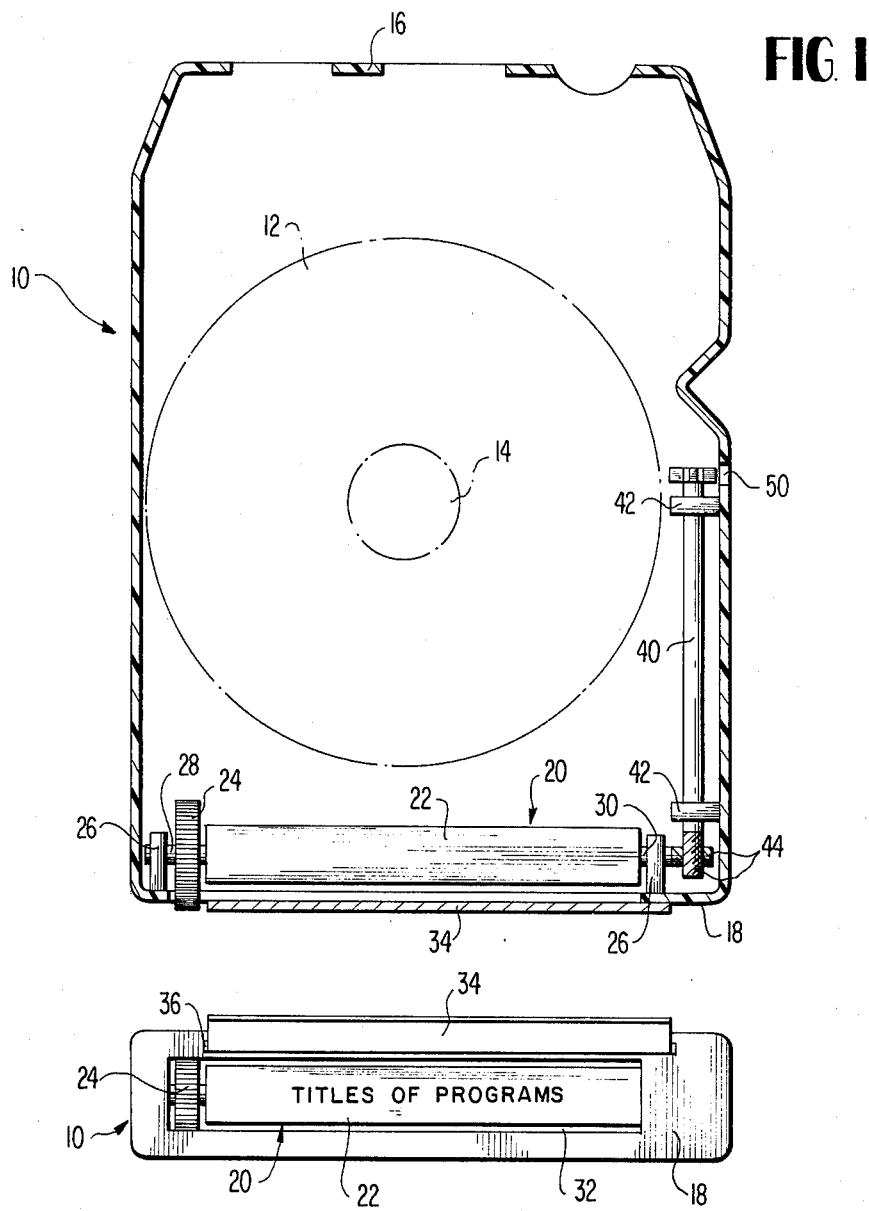
FIG. 1
FIG. 2
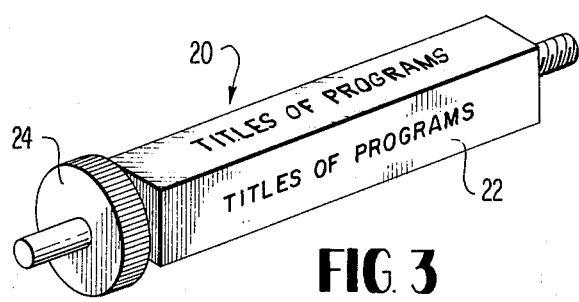
FIG. 3

DIRECT INDIVIDUAL PROGRAM READOUT OF EIGHT-TRACK TAPE CARTRIDGE

BACKGROUND OF THE INVENTION

This invention relates to magnetic tape reproduction apparatus, and more particularly to a device for directly indicating within a magnetic tape cartridge the individual programs currently being reproduced.

An increasingly large segment of the musical industry concerns recordings which are placed on a magnetic tape located within a cartridge for reproduction in the home or automobile in an appropriate magnetic tape reproduction apparatus. The conventional magnetic tape cartridge is generally rectangular on its top and bottom sides, with program indicia being located on its top side. However, when the tape cartridge is inserted within a magnetic tape reproduction apparatus, only a small portion of the cartridge protrudes from the reproduction apparatus, and as a consequence, all program indicia located on the cartridge is hidden from view.

The present invention provides for continual display of indicia regarding particular programs being reproduced from the magnetic tape cartridge while the cartridge is inserted within a reproduction apparatus. An opening is provided in the end of the tape cartridge and a program indicator shaft having at least four sides, with each side having thereon written information regarding the particular programs located on a particular track of the magnetic tape. A drive shaft extending along one side of the cartridge engages the program indicator shaft, the drive shaft being engaged through an aperture in the side of the tape cartridge by drive means located within the magnetic tape reproduction apparatus. The drive means is connected in parallel with the program indicator lights in the magnetic tape reproduction apparatus such that when the apparatus switches from one track of the magnetic tape to another, the drive means will rotate the drive shaft and program indicator shaft so that new indicia representative of the programs located on the newly selected track will appear through the opening. To initially synchronize the program indicator shaft with the program lights in the magnetic tape apparatus, a knurled knob is provided on the program indicator shaft for manual rotation thereof.

Other aspects and advantages of the invention will become apparent during the following detailed description, taken in connection with the accompanying drawings, and in which drawings:

DRAWINGS

FIG. 1 is a cross-section of a magnetic tape cartridge employing the apparatus of the present invention, FIG. 2 is a front view of the tape cartridge, FIG. 3 is a perspective view of the program read-out shaft, FIG. 4 is a partial section view of the tape cartridge when inserted within a magnetic tape player according to one embodiment of the present invention, and FIG. 5 is a partial section view of the construction of a bracket according to the present invention.

DETAILED DESCRIPTION OF THE INVENTION

Figure 4:
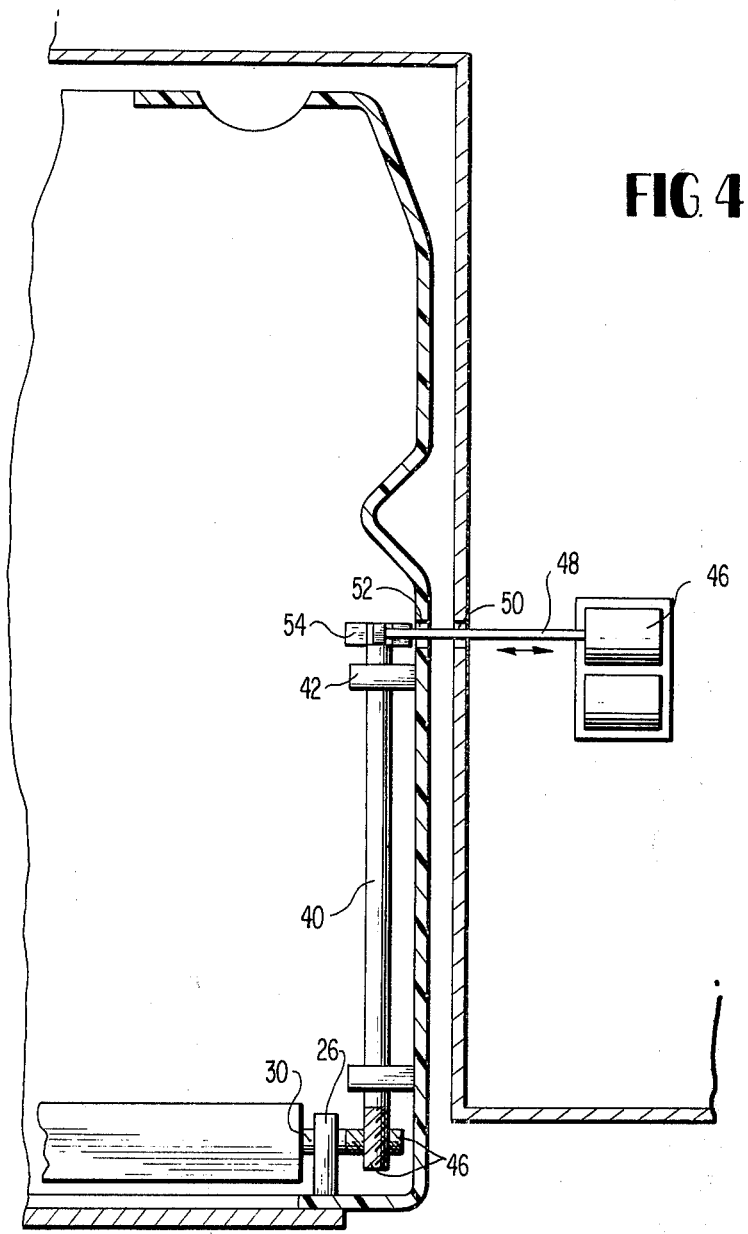

Referring now to the drawings, a magnetic tape cartridge is shown generally at 10. Although not illustrated in detail, the tape cartridge houses a magnetic tape 12 wound on a spool 14, with tape 12 guided by appropriate means such that it is available for reproduction by magnetic transducer heads positioned along end 16 of the tape cartridge.

To display the particular program located on a particular track of the tape contained within cartridge 10, a program indicator shaft 20 is employed. Indicia regarding the various programs is located on the four or more faces of read-out portion 22. Since there are four stereo tracks in an 8-track tape cartridge, each face of read-out portion 22 will carry the entire listing of programs for an appropriate stereo track, one such face being visible at a time, with rotation of the program indicator shaft upon change of tracks as will be further described. Program indicator shaft 20 also employs knurled knob 24 for preliminary adjustment of the program indicator shaft upon initial insertion of the tape cartridge within a magnetic tape player. Brackets 26 are employed to rotatably maintain program indicator shaft 20 within tape cartridge 10. To ensure precise alignment of the faces of program indicator shaft 20, brackets 26 can be octagon-shaped in cross section, with portions 28 and 30 of program indicator shaft 20 being, for example, diamond-shaped but of smaller cross-sectional size in order to allow rotation within brackets 26.

To display the particular programs located on read-out portion 22 of program indicator shaft 20, end 18 of cartridge 10 is constructed as shown in FIG. 2. An opening 32 is positioned adjacent readout portion 22 to allow protrusion of knurled knob 24 therethrough as well as viewing of one side of readout portion 22. To drive program indicator shaft 20, a drive shaft 40 is employed. Drive shaft 40 is mounted for rotation within brackets 42, and engages program indicator shaft 20 with an appropriate worm gear arrangement, generally shown at 44.

Rotation of drive shaft 40 when cartridge 10 is inserted within a magnetic tape player is effected as shown in FIG. 4. A relay or solenoid 46 in parallel with the program light indicator of the magnetic tape player is mounted in the tape player and includes a push shaft 48 extending from the armature of solenoid 46. When activated, push shaft 48 extends through aperture 52 of the tape player, entering magnetic tape cartridge 10 through aperture 52 and engaging spider gear 54 of drive shaft 40 as illustrated. Each extension of push shaft 48 and consequent engagement of spider gear 54 of drive shaft 40 causes a ¼ revolution of drive shaft 40 and program indicator shaft 20 (or other fraction corresponding to the number of indicator faces on shaft 20, e.g., ⅛ if an 8-track tape is not stereo). Since solenoid 46 is in parallel with the program light indicator of the magnetic tape player, solenoid 46 is actuated only when a new track of the magnetic tape located within cartridge 10 is being selected, and as a consequence, new program information located on readout portion 22 of program indicator shaft appears through opening 32 only when a new track is being played.

Often, when magnetic tape cartridge 10 is stored with other like cartridges, only end 18 will be visible. Therefore, I provide hinged flap 34 to identify the programs contained on the magnetic tape 12. Flap 34 is hinged at 36, and when closed, will cover substantially all of opening 32. Indicia indicative of programs located on all tracks of tape 12 is provided on flap 34, and is visible when flap 34 is closed over opening 32.

Figure 5:
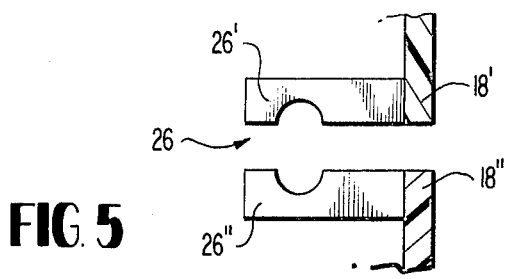

FIG. 5 illustrates one suitable construction of brackets 26. Bracket portions 26′,26″ are mounted on end portions 18',18'', respectively, as illustrated. When end portions 18',18'' are brought together, portions 26',26'' form bracket 26 for mounting program indicator shaft 20. Brackets 42 are formed in a like manner.

It should be evident that various modifications to my invention may be made without departing from the spirit or essential characteristics thereof. For example, if a magnetic tape with more than 8 tracks is employed, or if only one track is utilized at any one time, program indicator shaft 20 can be modified to include more than four readout faces, with the rotation equipment modified accordingly to provide for less than a 90° rotation of the program indicator shaft for each change of track. The scope of the invention is indicated by the following appended claims, and all changes which come within the meaning and intent of the claims will, therefore, not depart from the true spirit and scope of the invention.

What is claimed is:

1. A device for directly indicating the programs located on a particular track of a magnetic tape located within a cartridge while the programs on the particular track are being reproduced, comprising:
   a tape cartridge including an elongated opening in the front of the cartridge,
   an elongated program identifying member mounted for rotation in said cartridge directly behind said elongated opening, said program identifying member having a plurality of elongated faces, different ones of which are exposed behind said opening as said member is rotated, each face having the titles of programs located on a different track of said tape disposed thereon,
   a drive shaft along one side of said cartridge extending substantially perpendicular to said program identifying member,
   means interconnecting one end of said drive shaft and said program identifying member for causing said member to rotate when said drive shaft rotates, and
   an aperture in said tape cartridge adjacent the other end of said drive shaft to allow engagement therewith by a drive means located exteriorly of said cartridge.

2. Apparatus of claim 1 wherein said program identifying member is substantially square in cross-section for at least a portion of its length adjacent said opening, forming four faces thereon, each face including indicia indicative of particular programs located on a particular track of the magnetic tape.

3. Apparatus of claim 2 including a knurled knob located near one end of said program identifying member and protruding outwardly from said cartridge for manual adjustment of said member to initially synchronize the indicia on said program indicator shaft appearing through said opening with programs currently being produced from the magnetic tape.

4. Apparatus of claim 1 including hinged flap means located above said opening and closable thereover, said flap means bearing indicia indicative of all programs located on the magnetic tape, said indicia being visible when said flap is closed over said opening.

* * * * *